US006106624A

United States Patent [19]

Kazo et al.

[11] Patent Number: 6,106,624

[45] Date of Patent: Aug. 22, 2000

[54] TIPPER APPARATUS AND CARD-ISSUING SYSTEM

[75] Inventors: Osamu Kazo; Tsuyoshi Kokubo, both of Tokyo, Japan

[73] Assignee: NEC Corporation, Tokyo, Japan

[21] Appl. No.: 09/084,059

[22] Filed: May 26, 1998

[30] Foreign Application Priority Data

May 23, 1997 [JP] Japan .................................... 9-133840

[51] Int. Cl.[7] ............................ G01D 21/00; B44C 1/24; B32B 31/20; B30B 1/00; B41F 1/00

[52] U.S. Cl. ............................ 118/712; 118/202; 118/76; 118/77; 156/230; 156/247; 156/378; 156/538; 156/540; 156/583.1; 101/287

[58] Field of Search ............................ 118/46, 202, 712, 118/76, 77, 257; 156/230, 240, 277, 247, 280, 378, 538, 540, 583.1; 101/287, 336, 127

[56] References Cited

U.S. PATENT DOCUMENTS

| | | | |
|---|---|---|---|
| 4,343,837 | 8/1982 | DeLorenzo . | |
| 4,620,199 | 10/1986 | Tatsumi et al. | 346/76 PH |
| 5,424,762 | 6/1995 | Higashi et al. . | |
| 5,503,514 | 4/1996 | LaManna et al. | 414/753 |

FOREIGN PATENT DOCUMENTS 59-50775 4/1984 Japan .

*Primary Examiner*—Laura Edwards
*Assistant Examiner*—J. A. Lorengo
*Attorney, Agent, or Firm*—Whitham, Curtis & Whitham

[57] ABSTRACT

The present invention relates to a tipper apparatus for pigmenting the embossed section (raised characters for copying) of a card used to perform transactions by a customer at financial institutions or the like. The tipper apparatus comprises a card feeder for feeding a card; a pusher for pressing a color ribbon against the embossed section of the card fed by the card feeder; a ribbon driver for advancing and winding the color ribbon; and a controller for controlling the card feeder and the ribbon driver on the basis of tipping signals received from a host apparatus, transporting the card and the effective section of the ribbon to the pusher, and actuating the pusher. In addition, the controller comprises a color selector for performing a control routine such that the ribbon driver is controlled when a tipping color has been specified by the host apparatus, and a color area of the same color as the tipping color is selected from a plurality of color areas on the color ribbon and is transported to the pusher; and a pressure setter for setting the mode of operation for the pusher in accordance with the tipping color specified by the host apparatus.

12 Claims, 11 Drawing Sheets

(A)

(B)

TIPPER APPARATUS AND CARD-ISSUING SYSTEM

BACKGROUND OF THE INVENTION

1. Field of the Invention

The present invention relates to a tipper apparatus, and more particularly to a tipper apparatus for pigmenting the embossed section (raised characters for copying) of a card used by a customer for transactions at financial institutions or the like. The card may be a magnetic card with a magnetic stripe, or an embossed card without a magnetic stripe. The present invention also relates to a card-issuing system featuring the use of such a tipper apparatus. The present invention further relates to a color ribbon used in such a tipper apparatus.

2. Description of the Related Art

Conventional card embossers or tipper apparatus (tipping mechanisms) operate such that a monochrome ribbon is installed in each tipper, and embossed characters are pigmented when a card is issued. Consequently, tipping is limited to a single color when a card is issued using a card embosser.

When, however, a plurality of cards are issued and multicolor tipping is involved, tipper apparatus corresponding in number to the colors must be provided, resulting in a bulky card embosser profile and higher equipment costs.

In cases in which only one tipper apparatus can be mounted on the card embosser, the color ribbon must be replaced with the ribbon of the desired color each time the tipping color is changed, making it necessary to adjust the pressure, temperature, and time of the pusher for tipping matched to a particular color.

A drawback of such conventional examples is that multicolor pigmentation cannot be achieved with a single tipper apparatus. In other words, tipper apparatus or card embossers whose number is equal to the number of tipping colors must be made available in order to perform tipping with the desired color or to perform tipping with a color that matches the ground color of the card. This arrangement is disadvantageous in that tipper apparatus equal in number to the number of tipping colors must be provided when the goal is to issue multicolored cards with the aid of a single card embosser, increasing the external dimensions of the card embosser and raising equipment costs.

Another drawback of such conventional examples is that because a monochrome ribbon is mounted on a tipper apparatus, the color ribbon must be replaced every time the tipping color is changed when multicolor cards are issued with the aid of a single tipper apparatus, making it necessary to adjust the pressure, temperature, and time of the pusher during tipping in accordance with the tipping color, making it more time-consuming to issue cards, and impeding automation.

Japanese Laid-Open Utility Model Publication 59-50775 discloses a technique in which a pressure-sensitive coloring film is provided to the card surface, and embossed characters are pigmented without the use of a color ribbon by employing the pressure exerted during the formation of the embossed characters on the card. A drawback of this approach, however, is that intricate operations involved in the pasting of the pressure-sensitive coloring film over the card itself must be performed, raising the manufacturing costs of the card. In addition, there is the danger that portions subjected to accidental pressure will be colored if such pressure is applied to the card as a result of an impact.

SUMMARY OF THE INVENTION

It is an object of the present invention to provide a tipper apparatus capable of transferring a plurality of colors to the embossed section of a card, and of issuing cards by selecting tipping colors; and to provide a card-issuing system and a ribbon for use therewith.

With the foregoing in view, the tipper apparatus in accordance with the present invention comprises a card feeder for feeding a card; a pusher for pressing a color ribbon against the embossed section of the card fed by the card feeder; a ribbon driver for advancing and winding the color ribbon; and a controller for controlling the card feeder and the ribbon driver on the basis of tipping signals received from a host apparatus, transporting the card and the effective section of the ribbon to the pusher, and actuating the pusher.

In addition, the controller comprises a color selector for performing a control routine such that the ribbon driver is controlled when a tipping color has been specified by the host apparatus, and a color area of the same color as the tipping color is selected from a plurality of color areas on the color ribbon and is transported to the pusher; and a pressure setter for setting the mode of operation for the pusher in accordance with the tipping color specified by the host apparatus.

Furthermore, the arrangement adopted for proposed the color ribbon, which is mounted on a tipper apparatus for pigmenting the embossed section of a card and which is pressed against the embossed section, is such that ribbons constituting two color areas are connected to provide an alternating arrangement of these two color areas.

The controller of the tipper apparatus performs a control routine such that when a tipping color has been specified by the host apparatus, the color selector controls the ribbon driver, selects a color area of the same color as the tipping color from the plurality of color areas on the color ribbon, and transports this area to the pusher. In parallel with this, the pressure setter sets the mode of operation for the pusher in accordance with the tipping color specified by the host apparatus. This allows the controller to perform a control routine whereby the pusher exerts pressure based on the pressure, temperature, and time that correspond to the tipping color specified by the upper-level apparatus in accordance with the operational settings of the pressure setter. As a result, bichromatic pigmentation can be achieved with a single tipper apparatus (or tipper mechanism) through the use of a color ribbon in which two types of color areas form an alternating arrangement. This approach makes it unnecessary to prepare a plurality of tipper apparatus in order to issue a plurality of types of cards.

Tipping colors can be selected from the same color ribbon because the tipper apparatus is provided with a color ribbon in which ribbons constituting a plurality of color areas are connected to form an alternating arrangement of this plurality of color areas, and the controller of the tipper apparatus then performs a control routine such that when a tipping color has been specified by the host apparatus, the color selector controls the ribbon driver, selects a color area of the same color as the tipping color from the plurality of color areas on the color ribbon, and transports this area to the pusher. In parallel to this, each color can be tipped in an optimum manner because the pressure setter sets the mode of operation for the pusher in accordance with the tipping color specified by the host apparatus.

Consequently, multicolor pigmentation can be achieved with a single tipper apparatus (or tipper mechanism) through the use of a color ribbon in which a plurality of color areas form an alternating arrangement. The result is that a plurality of types of cards can be issued using a single tipper apparatus.

The present invention also allows the desired color to be selected and tipped on the embossed section of a card because the color ribbon is provided with leading-edge markers or position detection markers. In addition, using the present tipper apparatus makes it possible to reduce the outside dimensions and the cost of a card-issuing system (or card embosser) provided with such a tipper apparatus. Furthermore, processibility is improved because there is no need to replace the ribbon every time a new tipping color is used.

It is possible to prevent areas other than the embossed section of a card from being pigmented as a result of an accidental impact because the embossed section alone is pigmented with the color ribbon. In addition, the running costs of issuing cards can be kept low because several thousand cards can be tipped with a single multicolor ribbon.

BRIEF DESCRIPTION OF THE DRAWINGS

FIG. 3 is a diagram illustrating an example of a color ribbon for the tipping colors pertaining to the first embodiment, wherein FIG. 3A is a plan view, and FIG. 3B is a front view;

FIG. 4 is a diagram illustrating the overall structure of the tipper apparatus pertaining to the first embodiment, wherein FIG. 4A is a plan view, and FIG. 4B is a front view;

DESCRIPTION OF THE PREFERRED EMBODIMENTS

Figure 1:
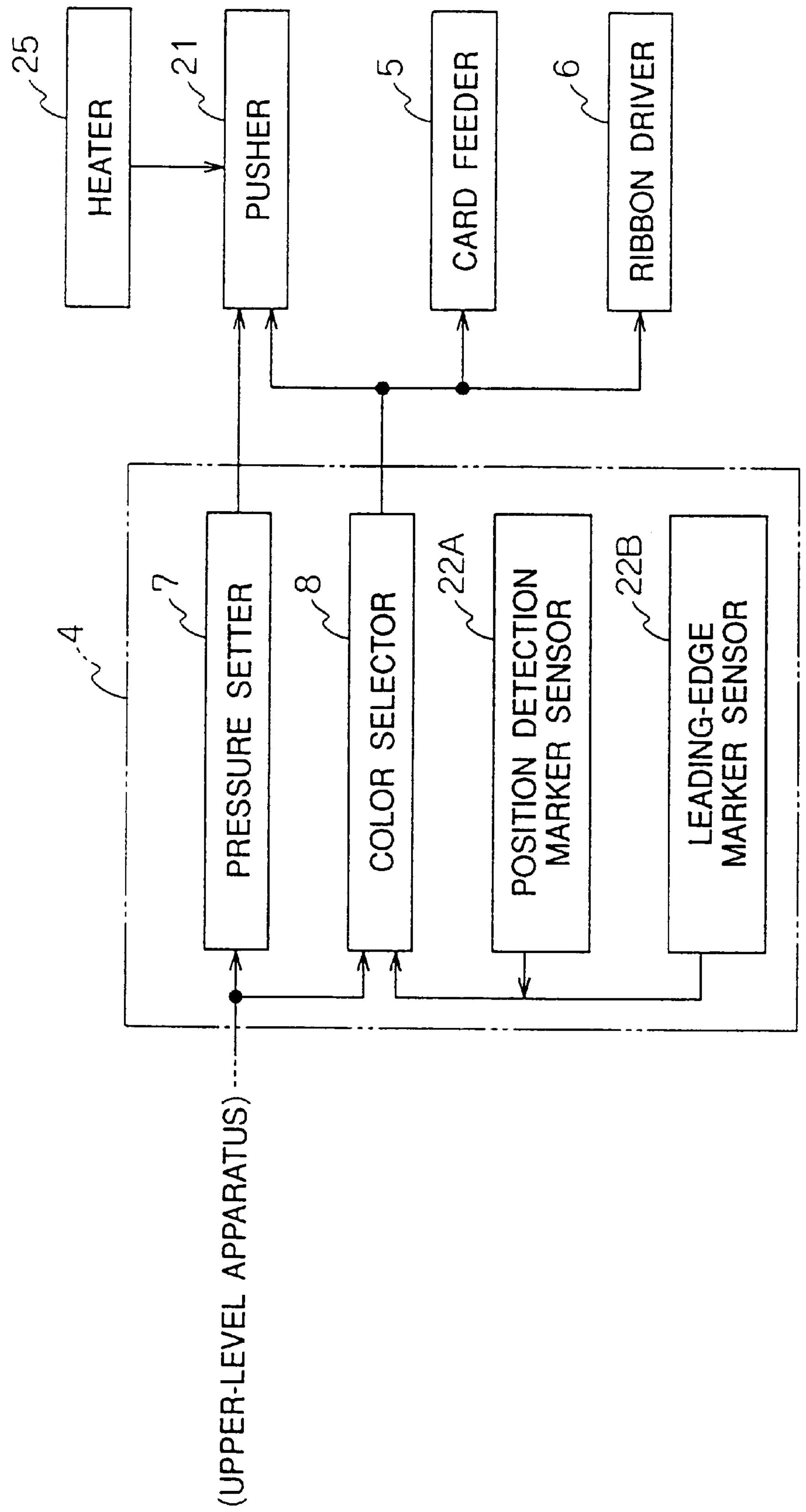
FIG. 1 is a block diagram depicting the structure of an embodiment of the present invention.

Embodiments of the present invention will now be described with reference to drawings. FIG. 1 is a functional block diagram depicting the overall structure of the tipper apparatus pertaining to these embodiments. As shown in FIG. 1, the tipper apparatus comprises a card feeder 5 for feeding cards, a pusher 21 for pressing a color ribbon against the embossed section of the card fed by the card feeder 5, a ribbon driver 6 for advancing and winding the color ribbon, and a controller 4 for controlling the card feeder 5 and the ribbon driver 6 on the basis of tipping signals received from a host apparatus, transporting the card and the effective section of the ribbon to the pusher 21, and actuating the pusher 21. The pusher 21 is also equipped with a heater 25 for heating the pusher.

The controller 4 comprises a color selector 8 for performing a control routine such that the ribbon driver is controlled when a tipping color has been specified by the host apparatus, and a color area of the same color as the tipping color is selected from a plurality of color areas on the color ribbon and is transported to the pusher 21; and a pressure setter 7 for setting the mode of operation for the pusher 21 in accordance with the tipping color specified by the host apparatus.

The pressure setter 7 is capable of setting the temperature, the pressing time, and the pressure exerted on the color ribbon by the pusher 21. Optimum pressure conditions for each tipping color (or the color ribbon of the corresponding color) are preset for each of the color areas on the color ribbon.

Figure 2:
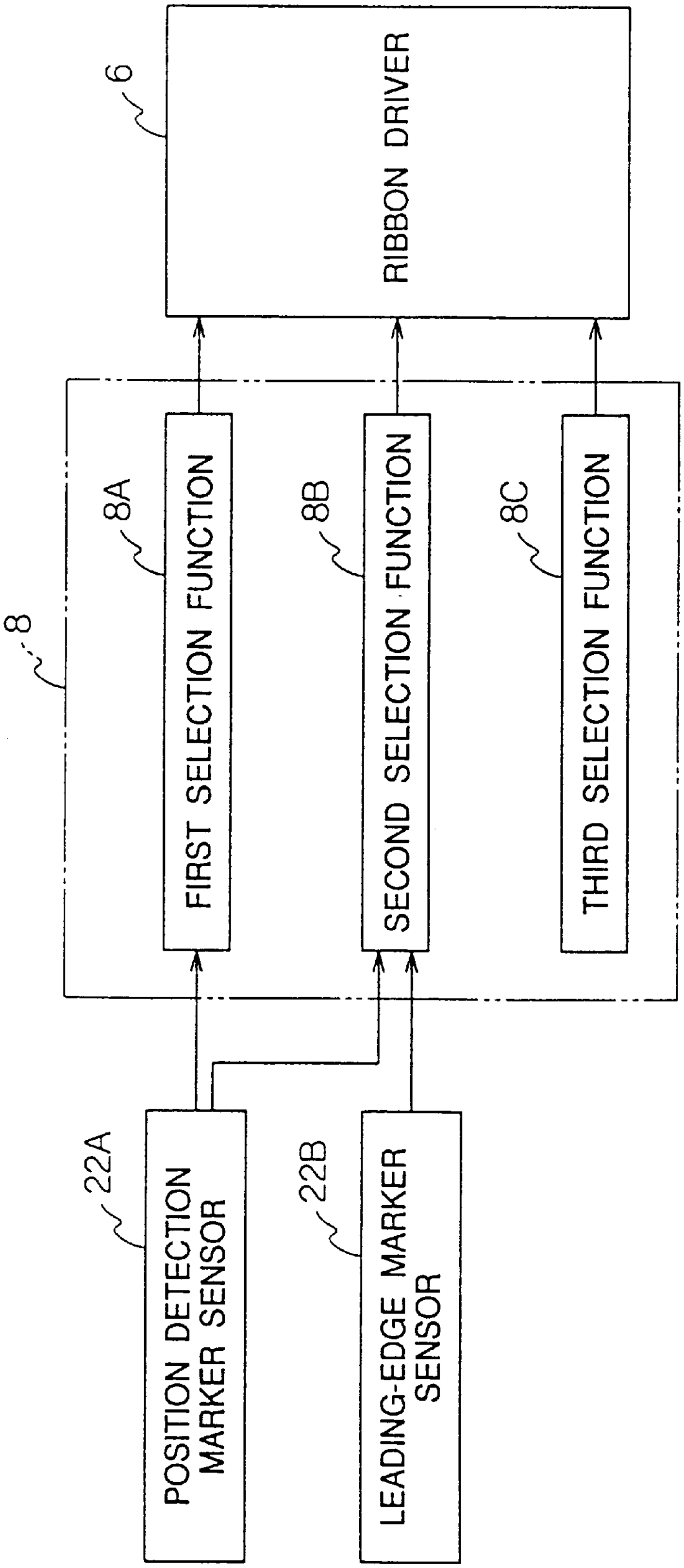
FIG. 2 is a block diagram depicting the structure of the color selector shown in FIG. 1.

FIG. 2 is a block diagram depicting the structure of the color selector 8 in further detail. A first embodiment involves the use of a color ribbon for a tipper apparatus such that ribbons constituting two color areas are connected to provide an alternating arrangement of these two color areas, and that the portions where the color areas are connected are provided with position detection markers for marking the initial position of each color area.

The controller 4 for the tipper apparatus is also provided with a position detection marker sensor 22A for sensing position detection markers formed in the color areas of a color ribbon provided with a plurality of color areas. The color selector 8 is provided with a first selection function whereby ribbon advance is controlled based on the output of the position detection marker sensor 22A. The first selection function allows a single color to be selected from the two color regions on the basis of the two types of position detection markers on the ribbon having two color areas.

A second embodiment involves the use of a color ribbon for a tipper apparatus such that ribbons consisting of a plurality of color areas are connected to provide an alternating arrangement of variation cycles, each of which is composed of the aforementioned plurality of color areas, and that the leading portions of the aforementioned variation cycles are provided with leading-edge markers for marking the leading edges of each of the aforementioned variation cycles.

The controller 4 of the second embodiment is also equipped with a leading-edge marker sensor 22B for reading leading-edge markers provided to the leading edges of the variation cycles of the color areas on a color ribbon having a plurality of such color areas. The color selector 8 is also provided with a second selection function 8B for performing a control routine in such a way that the ribbon is transported to the leading edges of the variation cycles of the color areas on the basis of the output from the leading-edge marker sensor 22B. The color selector 8 pertaining to the second embodiment selects an unused color from the plurality of colors of the color ribbon on the basis of the leading-edge markers or the ribbon and on the basis of a plurality of position detection markers. Physically, the lead detection marker sensor and the position detection marker sensor may be one and the same sensor.

A third embodiment involves using a color ribbon such that the length of each color area is set to a predetermined fixed distance. The color selector 8 of the tipper apparatus is also provided with a third selection function for selecting a color area on a color ribbon by advancing this color ribbon a predetermined fixed distance.

In the example shown in FIG. 2, the color selector 8 is provided with all three selection functions. In this case, it is possible to use any of the following three color ribbons: a color ribbon having two types of color areas provided with position detection markers; a color ribbon provided with a plurality of color areas at constant variation cycles (color cycles), and equipped with position detection markers and with leading-edge markers for marking the leading portions of the color cycles; and a color ribbon devoid of such detection markers but provided with color areas of predetermined length.

In such an embodiment, a single multicolor ribbon has a plurality of colors, and the desired color can be selected and tipped on the embossed characters of a card because of the presence of leading-edge markers or position detection markers. In addition, multicolor tipping can be performed with a single ribbon, and pressure, temperature, and time can be automatically adjusted in agreement with the tipping color, making it possible to perform multicolor tipping with the aid of a single tipper apparatus and to reduce the outside dimensions and the cost of the equipment for accommodating the tipper apparatus. It is also possible to dispense with the operations in which the ribbon is replaced and the pressure, temperature, and other parameters of the pusher are adjusted every time a new color is to be tipped.

Because embossed characters are pigmented using a multicolor ribbon, it is possible to prevent areas other than the embossed character of a card from being pigmented by an accidental impact. In addition, the running costs of issuing cards can be kept low.

A single card-issuing system provided with the tipper apparatus depicted in FIGS. 1 and 2 and with an embossing apparatus for forming embossed characters on cards can automatically issue a plurality of types of cards because any character can be formed and because any color can be selected from a plurality of colors and tipped on the embossed characters.

Figure 3:
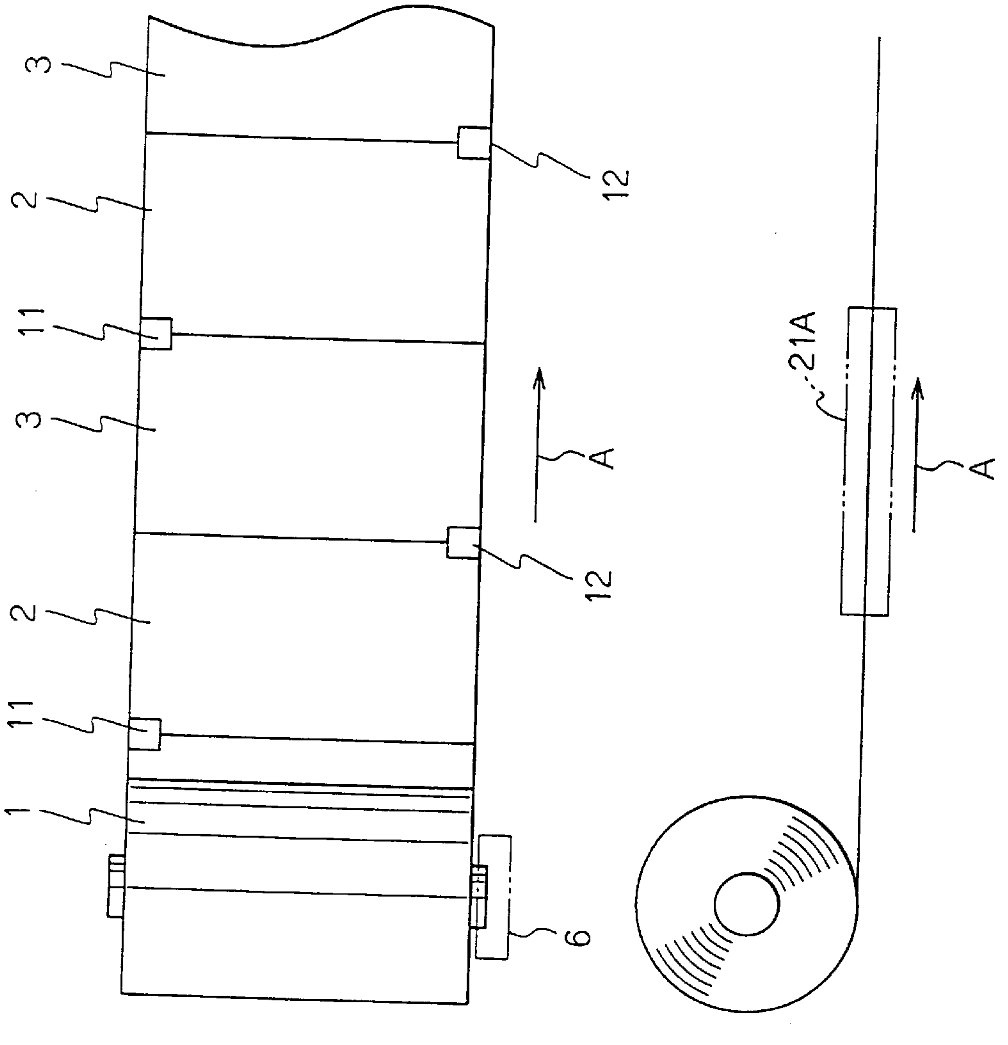

FIG. 3 is a diagram illustrating the structure of the color ribbon pertaining to the first embodiment. As shown in FIGS. 3A and 3B, constant lengths of gold color ribbons 2 and silver color ribbons 3 are alternately joined together, forming a single roll. A prescribed color area is positioned at pressure position 21A by unwinding this roll, as shown in FIG. 3B. The length of each color ribbon is determined by the position of the characters to be embossed on a card or by the number of rows of such characters. The length of a single roll is determined by the takeup weight or the like.

In addition, first and second position detection markers 11 and 12 for marking the starting position of each color are provided at the edges of joints between the gold color ribbons 2 and silver color ribbons 3. In FIG. 3, a first position detection marker 11 is a marker marking the beginning of a silver color ribbon, and a second position detection marker 12 is a marker indicating the beginning of a gold color ribbon. In the example depicted in FIG. 3, the first position detection markers 11 are positioned to the left of the direction of advance of the multicolor ribbon 1, and the second position detection markers 12 are positioned to the right, but a reverse arrangement is also possible.

The arrangement of the position detection markers 11 and 12 corresponds to the type of the position detection marker sensor 22A for monitoring/sensing the position detection markers facing the tipper apparatus. When, for example, a transmission-type sensor is used, portions corresponding to the position detection markers may be transparent (transparent film) or slitted. When a reflection-type sensor is used, a coated marker having a color whose reflectivity is markedly different from that of the gold or silver color may be provided. An example is a black coated marker. In the drawing, arrow A indicates the direction of travel of the color ribbon.

Figure 4:
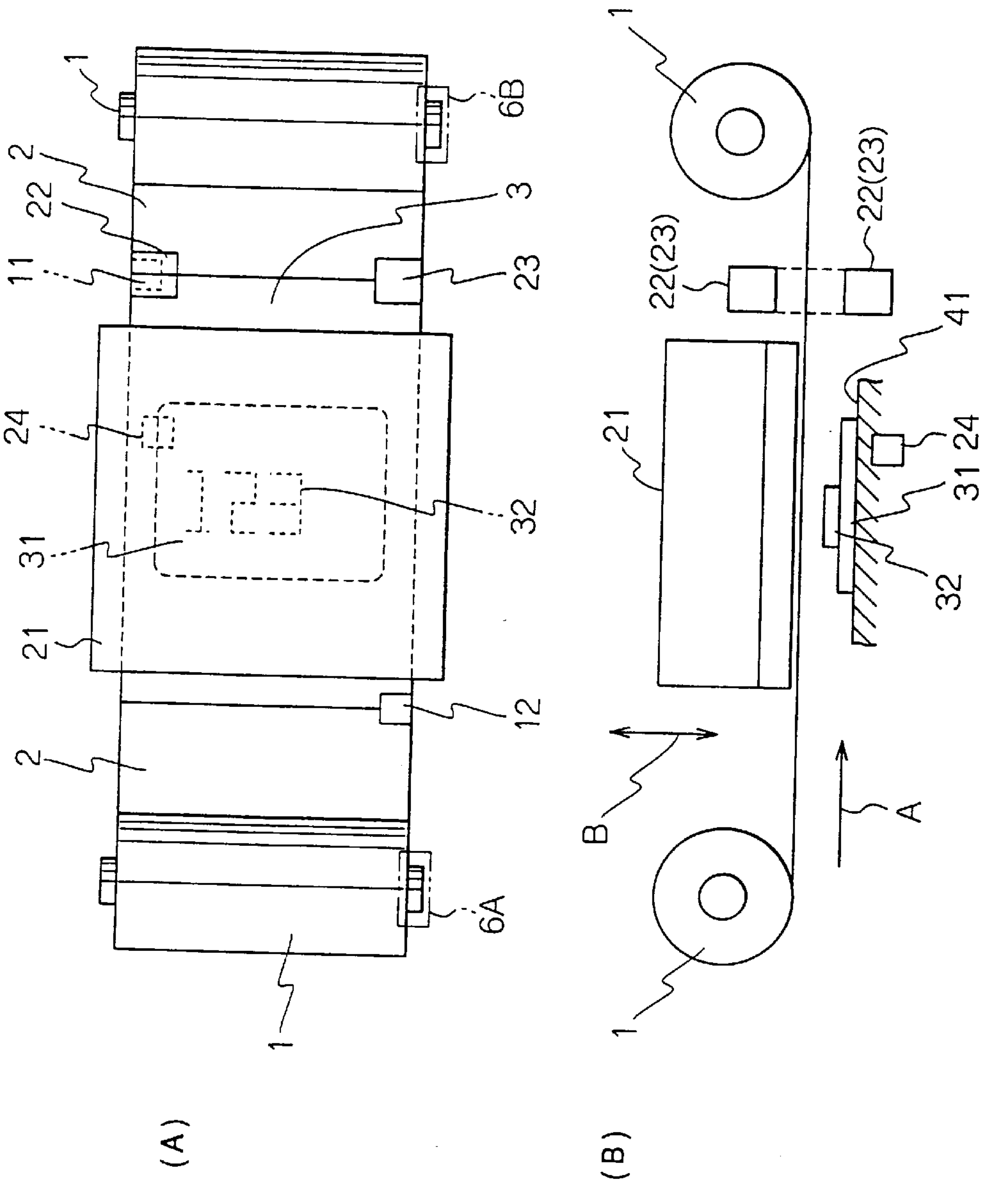

FIG. 4 is a schematic of a tipper apparatus (multicolor ribbon tipper) featuring the use of a multicolor ribbon. The tipper apparatus comprises a multicolor ribbon 1; a pusher 21 for pressing the multicolor ribbon 1 against a card 31 and pigmenting the characters embossed on the card 31; sensors 22 and 23 for monitoring/sensing the position detection markers on the multicolor ribbon 1; and a sensor 24 for monitoring the stoppage of the card 31 at a certain point. In addition, a feeder 5 comprises a feed route 41 for feeding the card 31, and a shifter (not shown) for transporting the card 31 along the feed route 41. In the example shown in FIG. 4, the sensor 22 is a sensor for monitoring/sensing the first position detection marker 11, and the sensor 23 is a sensor for monitoring/sensing the second position detection marker 12.

The tipper apparatus further comprises a ribbon driver 6 for advancing and winding the multicolor ribbon 1, a heater 25 for imparting heat to the pusher, a controller 4 for controlling the operation of the tipper apparatus and the exchange of commands and data with a host apparatus (for example, with the controller of the card embosser body), and the like. The ribbon driver 6 comprises a ribbon-advancing mechanism 6A for paying out the ribbon, and a ribbon-winding mechanism 6B for taking up the ribbon paid out by the ribbon-advancing mechanism 6A, as shown in FIG. 4.

The multicolor ribbon 1 is unwound from the ribbon-advancing mechanism 6A, fed between the pusher 21 and the feed route 41 (between the pusher 21 and the card 31), and is wound back on the ribbon-winding mechanism 6B after tipping has been completed. In the example shown in FIG. 4B, the sensors 22 and 23 are a transparent type. To optimize tipping, the controller 4 of the tipper apparatus stores data related to the pressure, time, and temperature of the pusher during tipping for each of the colors constituting the multicolor ribbon 1.

Figure 5:
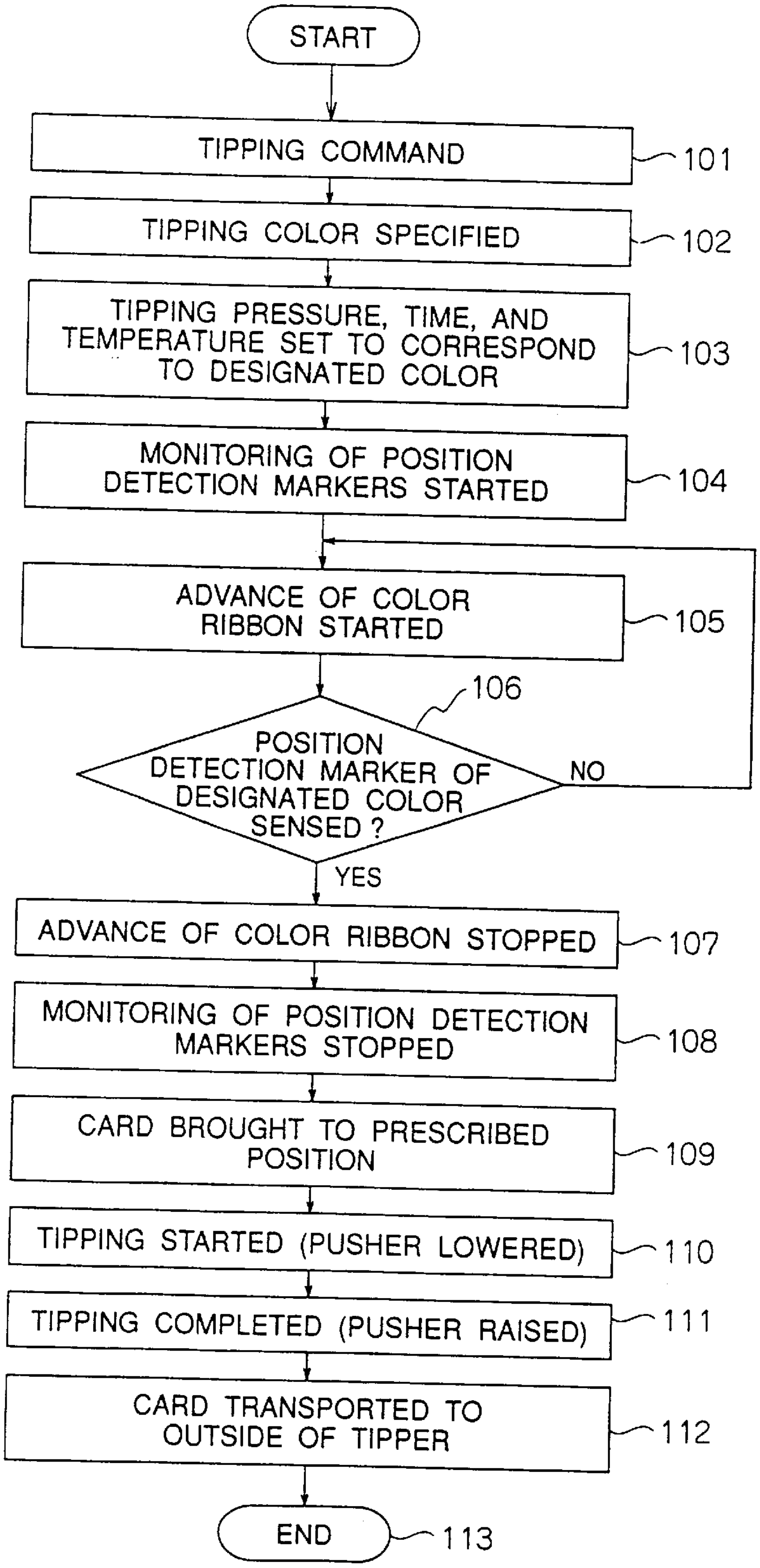
FIG. 5 is a flow chart depicting a working example pertaining to the first embodiment.

FIG. 5 is a flow chart depicting a working example of the tipper apparatus pertaining to a first embodiment. First, a tipping command is received from the controller of the card embosser mounted on the tipper apparatus of the present invention (step 101). The tipping command contains tipping color instructions, and the tipper apparatus starts preparing a designated color in accordance with the command (step 102). At the same time, the pressure, temperature, and time of the pusher 21 for tipping are set to correspond to the designated color (step 103), and the heater is adjusted to allow the pusher 21 to achieve the designated temperature.

The sensors 22 and 23 start monitoring the first and second position detection markers 11 and 12 on the multicolor ribbon 1 (step 104), the ribbon-advancing mechanism and the ribbon-winding mechanism are actuated, and the advance of the multicolor ribbon 1 is started (step 105). The multicolor ribbon 1 continues to be fed until either the sensor 22 or the sensor 23 senses the first or second position detection marker 11 or 12 of designated color (step 106).

The advance of the multicolor ribbon 1 is stopped once the sensor 22 or 23 senses the position detection marker 11 or 12 of designated color (step 107). At the same time, the monitoring of the position detection markers is stopped (step 108). The card 31 is subsequently brought to a prescribed position (position in which the sensor 24 senses the card 31) underneath the pusher 21 and the multicolor ribbon 1 (step 109).

The feeding of the card 31 is temporarily halted and a tipping procedure is started once the card 31 has been brought to the prescribed position. The pusher 21, which has been set to optimum temperature for the selected color, is lowered, and the multicolor ribbon 1 is pressed against the characters embossed on the card 31 with optimum force for the selected color (step 110). The pusher 21 is lifted and the multicolor ribbon 1 is separated from the card 31 once optimum time for the selected color has elapsed following the pressing of the multicolor ribbon 1 against the card 31 (step 111). The card 31 is fed underneath the multicolor ribbon 1 (step 112), and the tipping procedure involving the card 31 is completed (step 113).

Although the tipping procedure described above involved first feeding the multicolor ribbon 1 and then conveying the card 31, it is also possible to perform tipping by first feeding the card 31 and then conveying the multicolor ribbon 1. Another possibility is to perform tipping by simultaneously advancing the multicolor ribbon 1 and feeding the card 31.

An example will now be described in which a tipping command for a silver color is transmitted from the card embosser to the tipper apparatus.

The tipper apparatus receives the command; sets the pusher 21 to a pressure, temperature, and time considered optimal for the tipping of the silver color; and adjusts the temperature of the pusher 21 to the set temperature in order to prepare for the tipping of the silver color. At the same time, the ribbon-advancing mechanism and the ribbon-winding mechanism are actuated, the advance of the multicolor ribbon 1 is started, and the advance is stopped when a first position detection marker 11 has been detected by the sensor 22. The card 31 is brought underneath the pusher 21 and the multicolor ribbon 1 to a position in which the card 31 is sensed by the sensor 24, and the feeding of the card 31 is stopped when the card 31 has been sensed by the sensor 24. The pusher 21, which is set to optimum temperature, is lowered, and the multicolor ribbon 1 is pressed with a prescribed force against the characters embossed on the card 31. After a prescribed time has elapsed, the pusher 21 is lifted, the multicolor ribbon 1 is separated from the card 31, the card 31 is removed from the tipper apparatus, and the tipping procedure is completed. Tipping can thus be performed with a single tipper apparatus by selecting the desired color from a multicolored ribbon.

Figure 6:
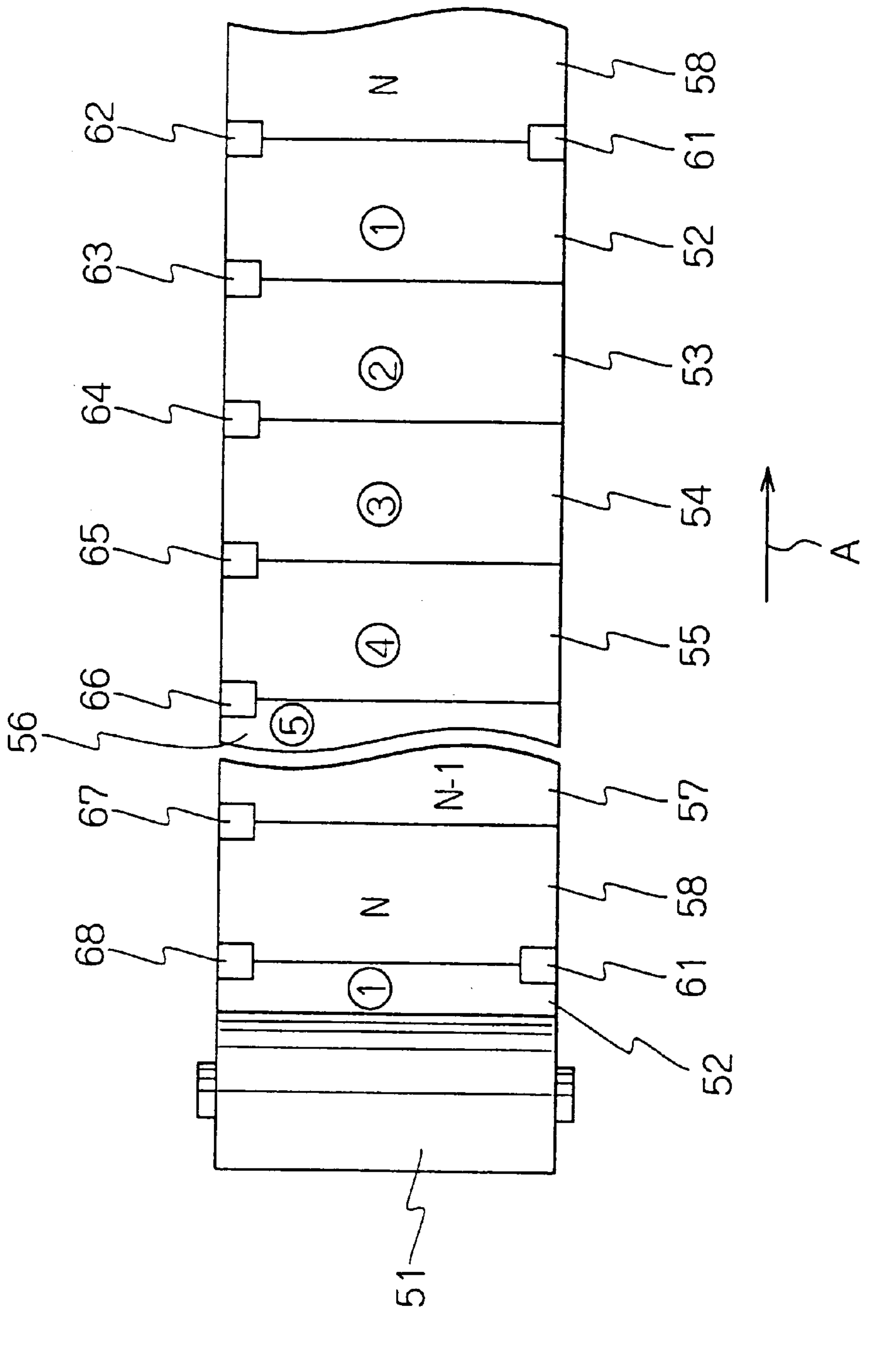
FIG. 6 is a diagram illustrating an example of a color ribbon for the tipper apparatus pertaining to a second embodiment.
Figure 7:
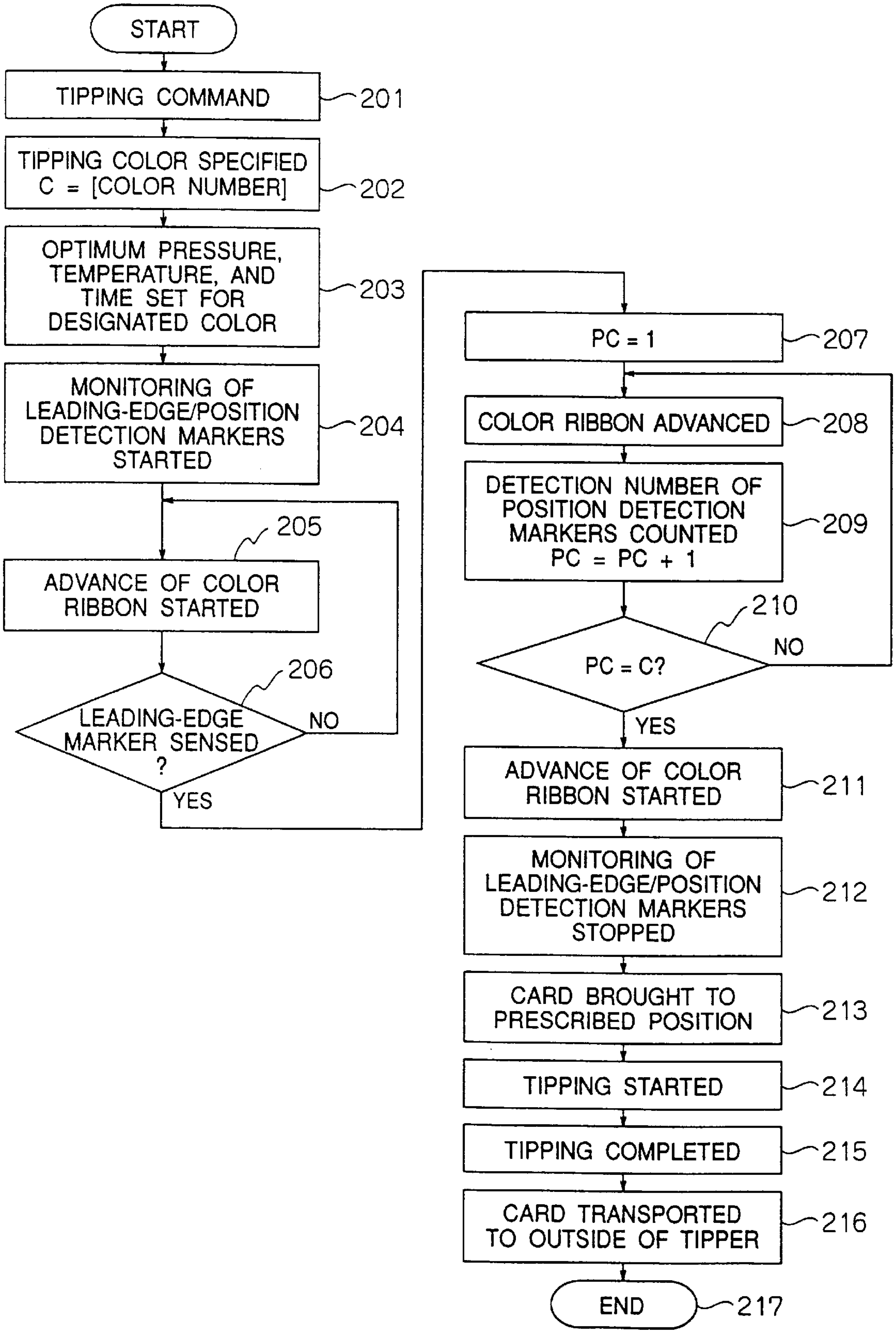
FIG. 7 is a flow chart depicting a working example pertaining to the second embodiment.
Figure 8:
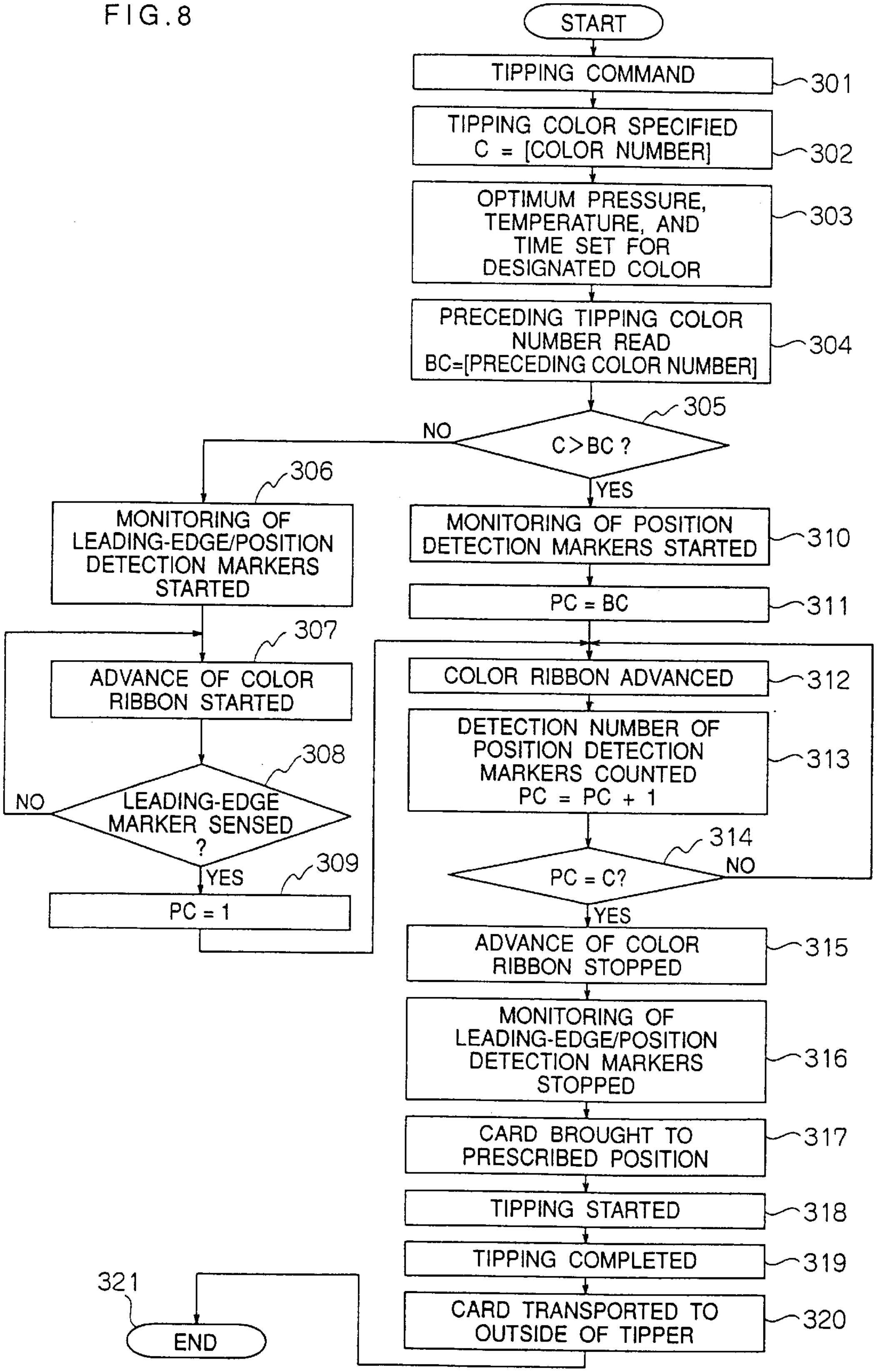
FIG. 8 is a flow chart depicting another working example pertaining to the second embodiment.

FIG. 6 depicts a second embodiment of the multicolor ribbon, and FIGS. 7 and 8 are working flow charts illustrating a case in which this multicolor ribbon is used. The multicolor ribbon pertaining to the first embodiment and the tipper apparatus featuring the use of this color ribbon were described with reference to a multicolor ribbon composed of two colors. In the present case, a multicolor ribbon composed of N colors is described together with the operation of a tipper apparatus featuring the use of this color ribbon.

FIG. 6 is a diagram illustrating an example of a multicolor ribbon 51 composed of N colors. A color variation cycle (color cycle) comprises, in order from left to right in FIG. 6, a first color 52, a second color 53, a third color 54, a fourth color 55, a fifth color 56, . . . , an (N-1)-th color 57, and an N-th color 58; and a multicolor ribbon 51 is formed by the cyclic joining of ribbons having such color cycles. In addition, the leading portions of the color areas are provided with position detection markers 62–68 for marking the positions of the colors. The first color 52 is provided with a position detection marker 62, the second color 53 with a position detection marker 63, the third color 54 with a position detection marker 64, the fourth color 55 with a position detection marker 65, the fifth color 56 with a position detection marker 66, the (N-1)-th color 57 with a position detection marker 67, and the N-th color 58 with a position detection marker 68.

The leading edge of the first color 52 is provided with a leading-edge marker 61 for marking the leading edge of the color cycle composed of the first color 52 through the N-th color 58. In the drawing, the leading-edge markers are positioned to the right of the direction of advance of the ribbon, and the position detection markers are located to the left, but a reverse arrangement is also possible.

The operation of a tipper apparatus featuring the use of the multicolor ribbon 51 will now be described with reference to the flow charts in FIGS. 7 and 8.

FIG. 7 is a flow chart depicting a working example pertaining to the second embodiment. When a tipping command is received from a card embosser or another upper-level device (step 201), the tipping color is designated based on the tipping color data contained in the command (step 202). Each color number corresponds to a certain value of parameter C. The first color 52 through the N-th color 58 are assigned the numbers 1, 2, . . . , N in the order indicated. Parameter C has a value of three when the third color 54 is designated.

Once the tipping color has been specified, a pusher pressure, temperature, and time considered optimal for the tipping color are set (step 203); the sensors 22 and 23 for monitoring/sensing the leading-edge markers/position detection markers start monitoring each marker (step 204); and the advance of the color ribbon is started (step 205). The position of the leading edge of a color cycle (that is, a leading-edge marker 61) is first monitored with the sensor 23 in order to sense the designated color, and the ribbon continues to be fed until the leading-edge marker 61 is sensed (step 206).

When the leading-edge marker 61 is sensed by the sensor 23, a "1," which denotes a leading edge, is set as a parameter PC for indicating the number at which the position detection marker has been sensed by the sensor 22 (PC=1; step 207). Ribbon advance is continued and the position detection markers are monitored by the sensor 22 in order to make the designated color available at a given position (step 208).

A "1" is added to parameter PC every time a position detection marker is sensed by the sensor 22 (step 209), and ribbon advance is continued until parameter PC coincides with parameter P for the designated color (step 210). Ribbon advance is stopped when PC=C because the position of the designated color is reached the moment the condition PC=C is met (step 211).

When the third color 54 is specified, the condition C=3 is first set, the ribbon is fed until the leading-edge marker 61 is sensed, the condition PC=1 is set the moment the leading-edge marker 61 is sensed, the ribbon is fed further, the condition PC=2 is achieved the moment the position detection marker 63 of the second color 53 is sensed, the ribbon is fed some more because PC≠C holds true, the condition PC =3 is achieved the moment the position detection marker 64 is sensed, ribbon advance is stopped because the condition PC=C is achieved, and the third color 54 is made available at a given position.

The subsequently performed tipping procedure (steps 212–217) is not described herein because this procedure is performed in the same manner as above.

A designated color can thus be made available at a given position by counting the position detection markers between the leading edge of the color cycle and the position of the designated color, making it possible to accommodate an increased number of tipping colors (first color to N-th color).

FIG. 8 is a flow chart depicting another working example pertaining to the second embodiment. The routine described in FIG. 7 is disadvantageous in that much of the color ribbon is wasted because a single tipping procedure requires an entire color cycle. Specifically, if the fifth color 56 is to be tipped subsequent to the tipping of the third color 54, the procedure described in FIG. 7 requires that the leading-edge marker 61 be first sensed, with the result that the ribbon is brought to the leading-edge marker 61 of the first color 52 after the third color 54 has been tipped, and the advance is continued until the desired color (fifth color 56) is reached. In other words, the example shown in FIG. 7 involves advancing the ribbon from the third color 54 to the fifth color 56 of the next color cycle, wasting an entire color cycle. A procedure performed in accordance with the flow chart of FIG. 8 addresses this problem.

A tipping command is received, a tipping color is designated, and optimum pressure, temperature, and time are set for tipping (steps 301–303; a description of this procedure is omitted because it is identical to the one described above (steps 201–203)). The color symbol designated for the preceding tipping procedure is then read, a setting is made for the parameter BC of the previously designated color (step 304), and the currently designated color C is compared with the previously designated color BC (step 305; a search is performed to determine whether the currently designated color is located behind or in front of the previously designated color within the color cycle)

Because there is no need to first feed the ribbon to the leading edge if the condition C≦BC is true (that is, if the currently designated color is in front of the previously designated color) (steps 306–309), the subsequent procedure is the same as that in FIG. 7 (steps 204–207). This procedure will not be described here because it has already been described above.

The sensor 22 begins monitoring the position detection markers (step 310) if C>BC (that is, if the currently designated color is behind the previously designated color), and pattern PC, which corresponds to the number of times a position detection marker has been sensed, is assigned the number (parameter BC) of the previously designated color (PC=BC, step 311). Position detection markers are counted until the currently designated color is reached, and the ribbon is fed until PC=C. Specifically, C=5 and BC=3 (C>BC) when the previously designated color is the third color 54, and the currently designated color is the fifth color 56. Consequently, the condition PC=BC=3 is achieved, the ribbon is fed, the condition PC=4 is achieved the moment the sensor 22 senses the position detection marker 65 of the fourth color 55, the condition PC=5=C is achieved the moment the position detection marker 66 of the fifth color 56 is sensed, ribbon advance is stopped, and the setting of the currently designated color at a given position is completed.

A description of the subsequent procedure is omitted because this procedure is the same as the one described above (steps 208–217).

Thus, the procedure depicted in FIG. 8 allows tipping to be performed within the same color cycle when a designated color is behind a previously designated color within this color cycle, preventing the color ribbon from being wasted in the manner described with reference to the procedure depicted in FIG. 7, and making it possible to use the color ribbon in an efficient manner.

A third embodiment will now be described. The above description of a multicolor ribbon and of a tipper apparatus featuring the use of such a multicolor ribbon referred to a method for sensing the position detection marker of each color with a sensor and making designated colors available at given positions (performing a positioning procedure). The description that follows refers to making designated colors available at given positions by feeding the color ribbon a given distance (rather than by sensing the position detection markers).

Figure 9:
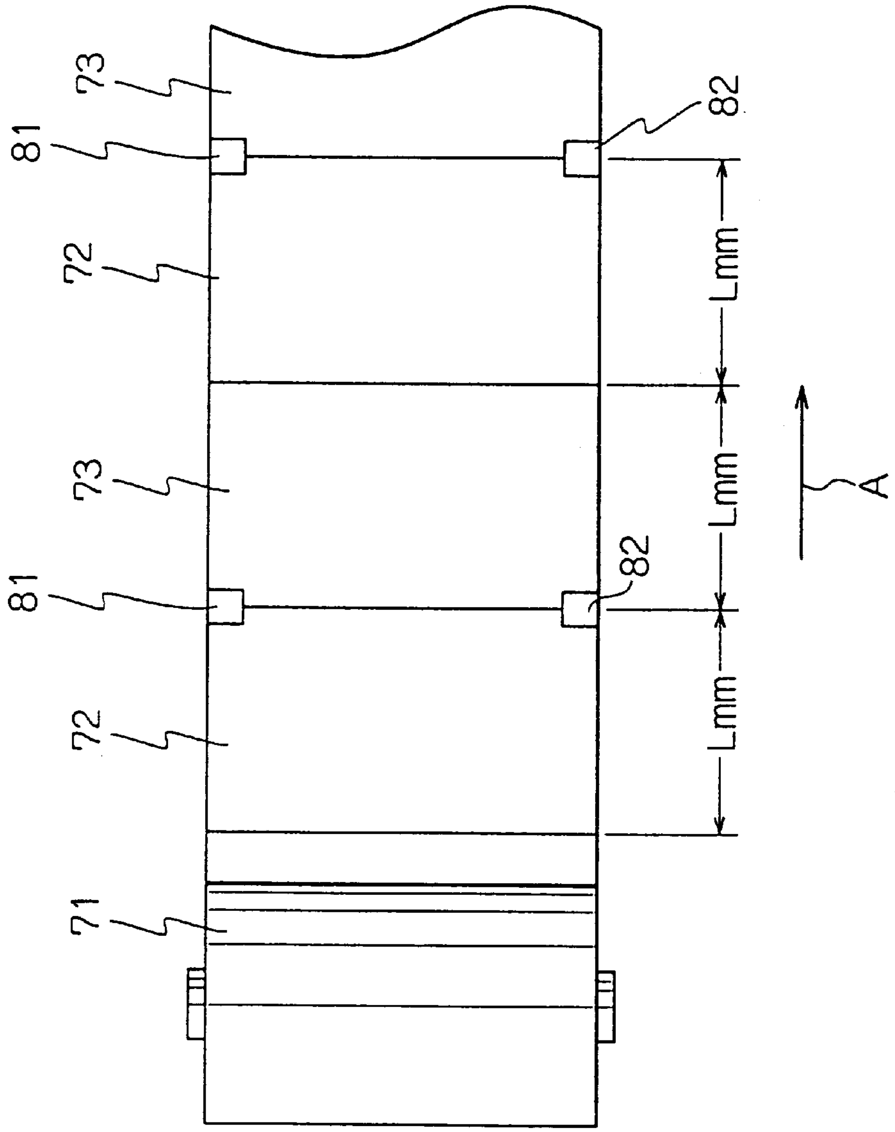
FIG. 9 is diagram illustrating an example of a color ribbon for the tipper apparatus pertaining to a third embodiment.

FIG. 9 depicts a multicolor ribbon 71 composed of two colors. A color variation cycle (color cycle) contains a gold color 72 and a silver color 73, and color ribbons forming this color cycle are cyclically joined together to form an integral multicolor ribbon 71. In addition, leading-edge markers 81 and 82 for marking the leading edge of a color cycle are provided at the leading edge of the gold color 72. Although FIG. 9 depicts a case in which the leading-edge markers are positioned on both sides of the direction of advance of the ribbon, it is also possible to position the markers on the right or left side alone.

Figure 10:
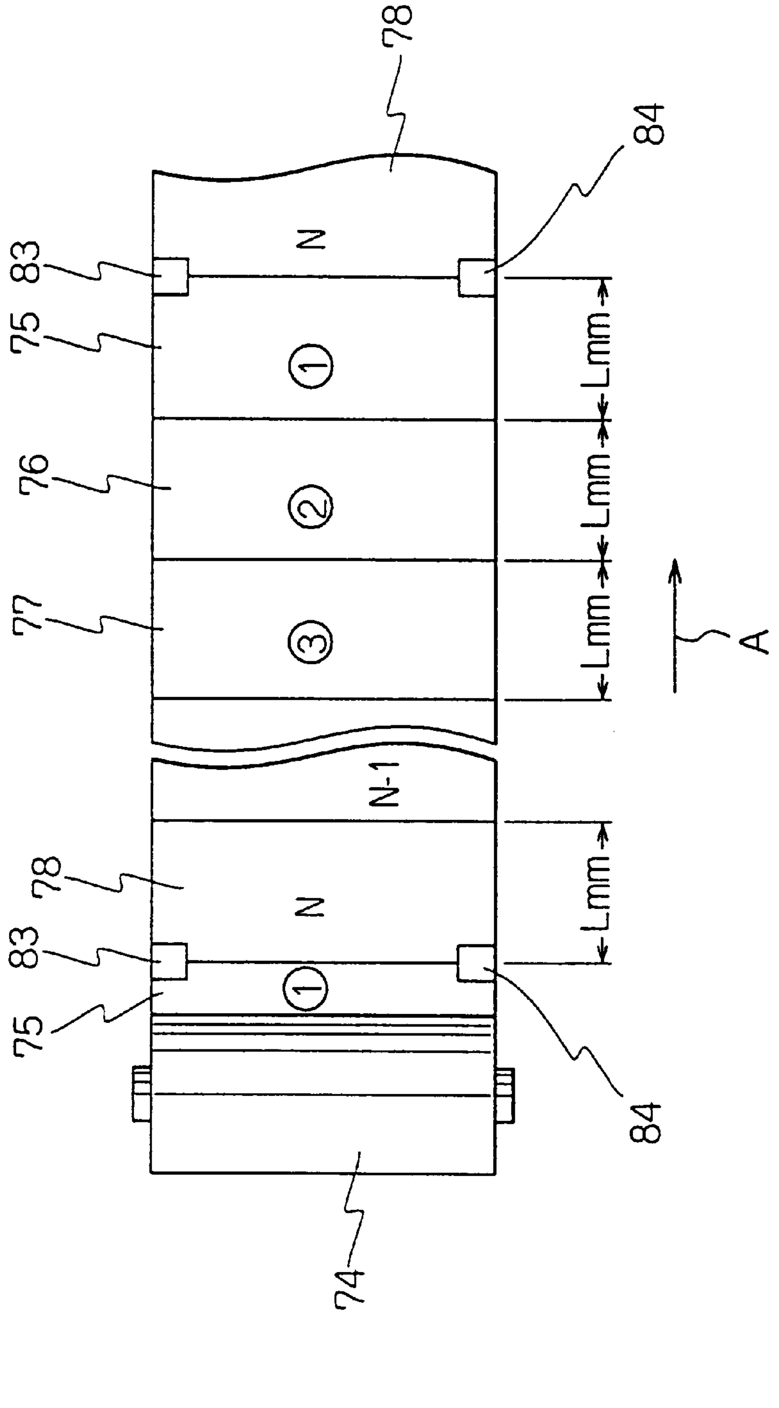
FIG. 10 is a diagram illustrating another example of a color ribbon for the tipper apparatus pertaining to the third embodiment.

FIG. 10 depicts a multicolor ribbon 74 composed of N colors. A color variation cycle (color cycle) contains a first color 75, a second color 76, a third color 77, and so on to an N-th color 78, and color ribbons forming this color cycle are cyclically joined together to form an integral multicolor ribbon 74. In addition, leading-edge markers 83 and 84 for marking the leading edge of a color cycle composed of the first color 75 through the N-th color 78 are provided at the leading edge of the first color 75. Although the drawing depicts a case in which the leading-edge markers are positioned on both sides of the direction of advance of the ribbon, it is also possible to position the markers on the right or left side alone.

Figure 11:
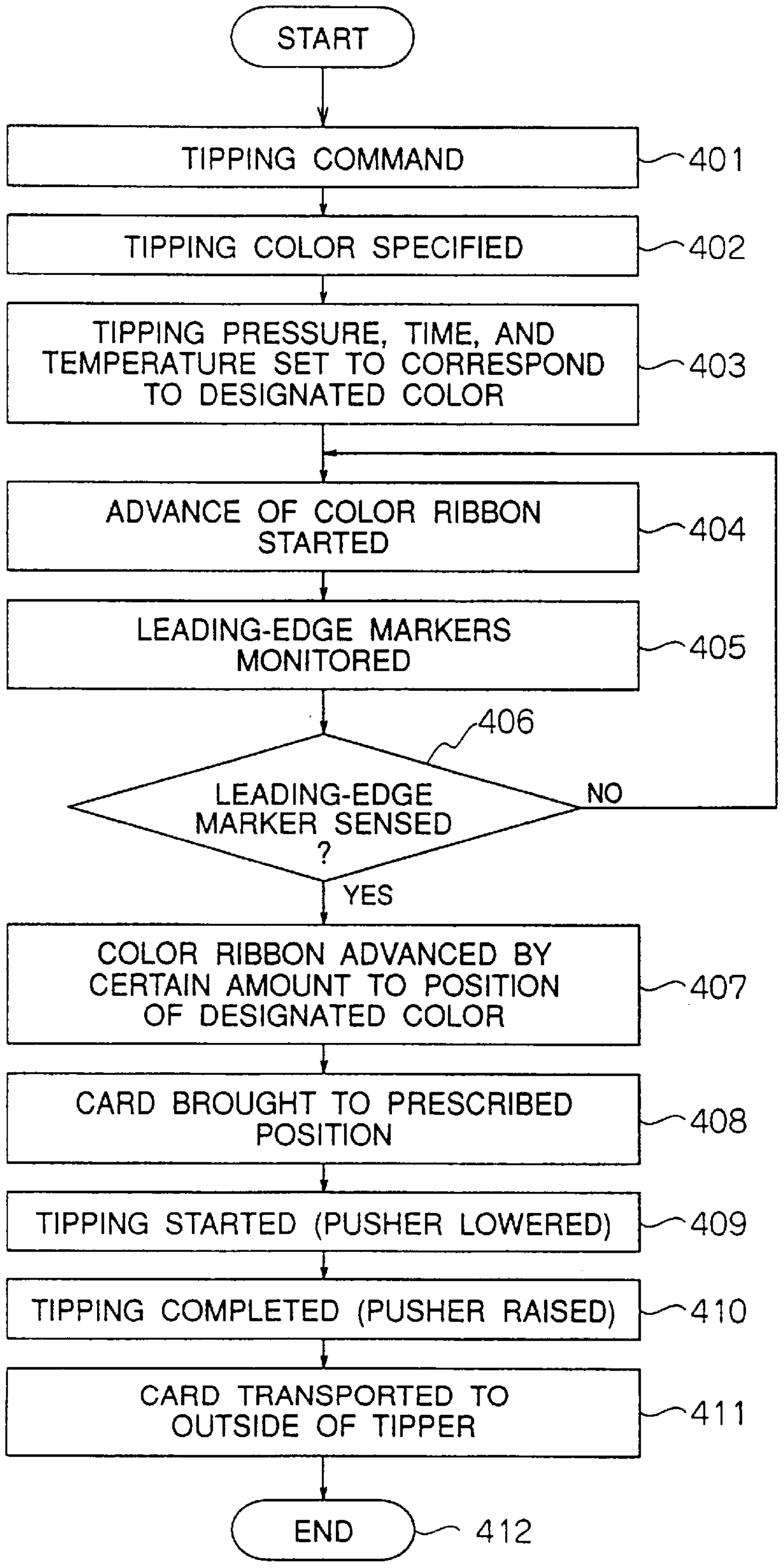
FIG. 11 is a flow chart depicting a working example pertaining to the third embodiment.

FIG. 11 is a flow chart depicting a working example pertaining to the third embodiment. When a tipping command is received from a card embosser or another upper-level device (step 401), the tipping color is specified based on the tipping color data contained in the command (step 402). Once the tipping color has been specified, a pusher pressure, temperature, and time considered optimal for the tipping color are set (step 403); the advance of the color ribbon is started (step 404); and the sensors 22 and 23 for monitoring/sensing the leading-edge markers start monitoring the leading-edge markers 83 and 84 (step 405).

Such ribbon advance is continued until the leading-edge markers 83 and 84 are sensed by the sensors 22 and 23 (step 406). The ribbon is fed a given distance in proportion to the designated color when the leading-edge markers 83 and 84 have been sensed by the sensors 22 and 23 (step 407). In other words, specifying an M-th color causes the ribbon to be fed by [M−1]'Lmm, where Lmm is the length of the monochrome ribbon.

In addition, using a stepper motor for advancing the ribbon allows the ribbon to be fed in a measured fashion to the designated color by setting the number of steps for the motor because such an arrangement makes it possible to determine the number of steps through which the motor has to pass before the monochrome ribbon is fed a distance of Lmm. When, for example, the third color 77 is specified, the designated third color 77 can be made available at a given position by feeding the ribbon a distance of [3−1]×Lmm (that is, 2 Lmm) after the leading-edge markers 83 and 84 have been sensed by the sensors 22 and 23. A description of the subsequent tipping procedure (steps 408–412) is omitted because this procedure is the same as the one described above (steps 109–113).

Thus, the third embodiment allows a designated color to be made available at a given position by advancing the ribbon a prescribed length ([N−1]×Lmm) from the leading edge of a color cycle to the position of the designated color, making it possible to accommodate an increased number of tipping colors (first color to N-th color). An advantage of this method is that the costs of manufacturing multicolor ribbons can be reduced in comparison with those of manufacturing multicolor ribbons in accordance with the first or second embodiment because there is no need to provide position detection markers for each color.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-133840 (Filed on May 23, 1997) including specification, claims, drawings and summary are incorporated herein by reference in its entirety.

What is claimed is:

1. A tipper apparatus for pigmenting the embossed section of a card, comprising:

a card feeder for feeding a card;

a pusher for pressing a color ribbon against an embossed section of the card being fed;

a ribbon driver for advancing and winding the color ribbon; and a controller for controlling [the] said card feeder and said ribbon driver on the basis of tipping signals received from a host apparatus, transporting the card and the effective section of the ribbon to said pusher, and actuating said pusher;

wherein said controller comprises:

a color selector for performing a control routine such that said ribbon driver is controlled when a tipping color has been specified by the host apparatus, and a color area of the same color as the tipping color is selected from a plurality of color areas on the color ribbon and is transported to said pusher; and a pressure setter for setting [the] a mode of operation for said pusher in accordance with the tipping color specified by the host apparatus, wherein the mode of operation comprises for each tipping color a temperature, a pressing time, and a pressure exerted on the color ribbon by said pusher.

2. The apparatus as defined in claim 1, wherein said controller further comprises a position detection marker sensor for reading position detection markers provided to each color area of a color ribbon having a plurality of color areas, and possesses a first selection function whereby ribbon advance is controlled based on the output of the position detection marker sensor.

3. The apparatus as defined in claim 2, wherein the first selection function allows a single color to be selected from the two color regions of the color ribbon on the basis of two types of position detection markers on the color ribbon.

4. The apparatus as defined in claim 3, wherein said controller further comprises a leading-edge marker sensor for reading leading-edge markers provided to the leading edges of the variation cycles of the color areas on a color ribbon having a plurality of such color areas, and possesses a second selection function for performing a control routine in such a way that the ribbon is transported to the leading edges of the variation cycles of the color areas on the basis of the output from the leading-edge marker sensor.

5. The apparatus as defined in claim 4, wherein the color selector selects an unused color from the plurality of colors of the color ribbon on the basis of the leading-edge markers of the color ribbon and on the basis of a plurality of position detection markers.

6. The apparatus as defined in claim 4, wherein the color selector selects a color area within a variation cycle when the current tipping color is compared with the preceding color and is found to be at a rearward position within this variation cycle.

7. The apparatus as defined in claim 4, wherein said controller possesses a third selection function for selecting a color area on a color ribbon by advancing this color ribbon a predetermined fixed distance.

8. The apparatus as defined in claim 7, further comprising a heater for heating said pusher in accordance with the mode of operation.

9. A tipper apparatus for pigmenting the embossed section of a card, comprising:

means for feeding the card;

means for pushing a color ribbon against an embossed section of the card being fed;

means for advancing and winding the color ribbon; and means for controlling said feeding means and said advancing means on the basis of tipping signals received from a host apparatus, transporting the card and the effective section of the ribbon to said pushing means, and actuating said pushing means;

wherein said control means comprises:

means for performing a control routine such that said advancing means is controlled when a tipping color has been specified by the host apparatus, and a color area of the same color as the tipping color is selected from a plurality of color areas on the color ribbon and is transported to said pushing means; and means for setting a mode of operation for said pushing means in accordance with the tipping color specified by the host apparatus wherein the mode of operation comprises for each tipper color, a temperature, a pressing time, and a pressure exerted on the color ribbon by said pushing means.

10. The apparatus as defined in claim 9, wherein said control means further comprises:

means for reading position detection markers formed in each color area of a color ribbon provided with a plurality of color areas, and means for controlling the advance of the ribbon based on an output of said reading means.

11. The apparatus as defined in claim 10, wherein said means for controlling the advance allows a single color to be selected from two color regions of the color ribbon on the basis of the two types of position detection markers on the color ribbon.

12. A card-issuing system, comprising an embossing apparatus for forming embossed sections on cards, and a tipper apparatus for pigmenting the embossed sections formed with the aid of this embosser, wherein the tipper apparatus comprises:

a card feeder for feeding a card;

a pusher for pressing a color ribbon against an embossed section of the card fed by said card feeder;

a ribbon driver for advancing and winding the color ribbon; and a controller for controlling said card feeder and said ribbon driver on the basis of tipping signals received from a host apparatus, transporting the card and the effective section of the ribbon to said pusher, and actuating said pusher;

wherein said controller comprises:

a color selector for performing a control routine such that said ribbon driver is controlled when a tipping color has been specified by the host apparatus, and a color area of the same color as the tipping color is selected from a plurality of color areas on the color ribbon and is transported to said pusher; and a pressure setter for setting a mode of operation for said pusher in accordance with the tipping color specified by the host apparatus, wherein the mode of operation comprises, for each tipping color, a temperature, a pressing time, and a pressure exerted on the color ribbon by said pusher.

* * * * *